June 23, 1925.
J. L. WILLIAMS
VALVE
Filed Sept. 11, 1923    2 Sheets-Sheet 1
1,543,410
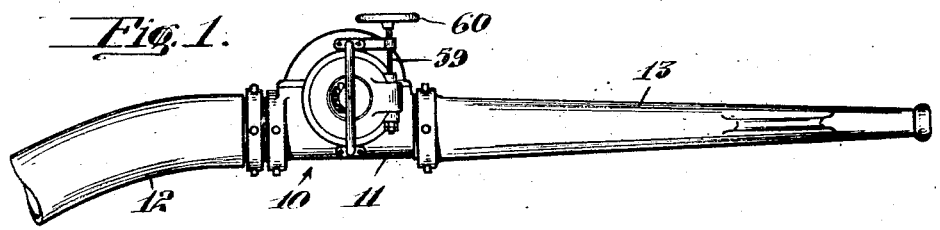
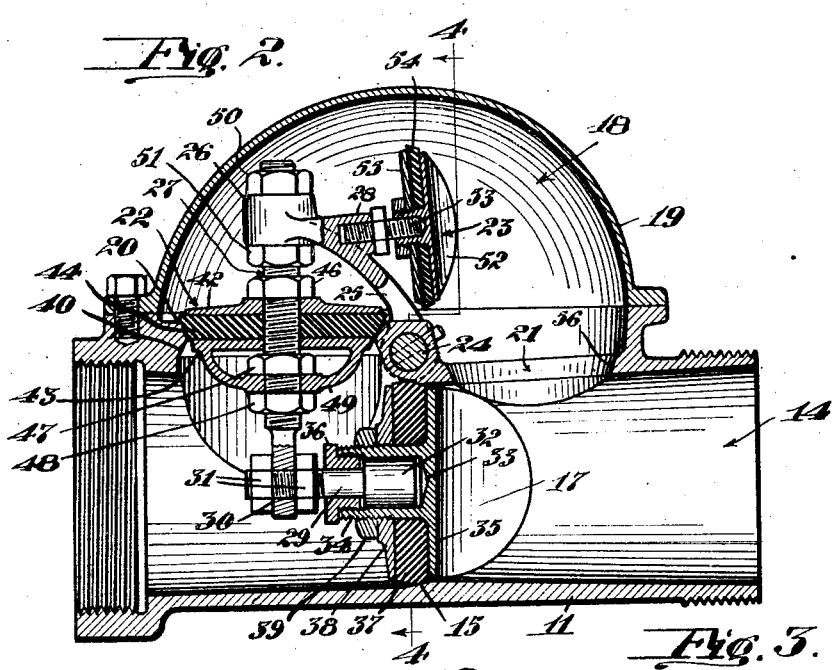
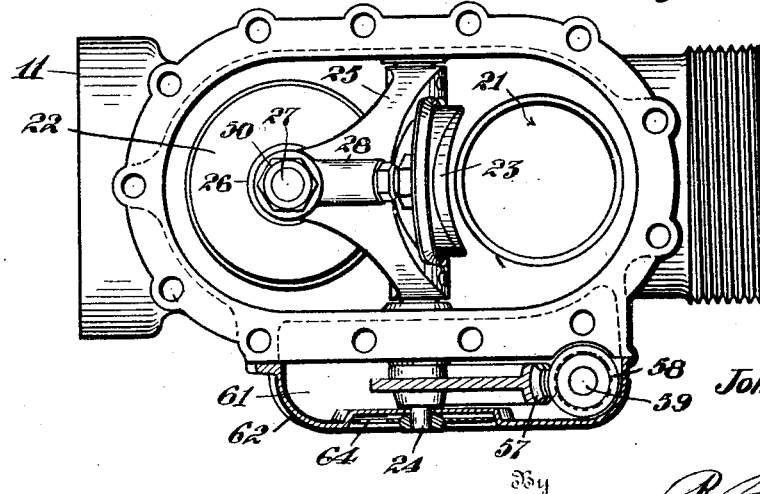
Inventor
John L. Williams:
By R. S. Burr
Attorney June 23, 1925.  1,543,410
J. L. WILLIAMS
VALVE
Filed Sept. 11, 1923    2 Sheets-Sheet 2

Inventor
John L. Williams,
By R. S. Berry
Attorney

Patented June 23, 1925.

1,543,410

UNITED STATES PATENT OFFICE.

JOHN L. WILLIAMS, OF LOS ANGELES, CALIFORNIA.

VALVE.

Application filed September 11, 1923. Serial No. 662,028.

*To all whom it may concern:*

Be it known that I, JOHN L. WILLIAMS, a citizen of the United States, residing at Los Angeles, in the county of Los Angeles and State of California, have invented new and useful Improvements in Valves, of which the following is a specification.

This invention particularly pertains to a valve which is especially adapted for use on a fire hose for controlling the discharge of water through the hose nozzle.

An object of the invention is to provide a valve which is so constructed that it may be easily and quickly opened and closed, and when in its wide open position will afford a practically unobstructed flow of water to the nozzle.

Another object is to provide a valve of the above character which is so constructed as to reduce the possibility of whipping of the hose nozzle.

Another object is to provide a construction in the valve which will obviate grinding and wear of the valve and seat, due to sand and grit.

Another object is to provide a balanced valve construction whereby the valve may be easily operated either in opening or closing the valve under heavy water pressure.

A further object is to provide a means for actuating the valve by which proper opening and closing of the valve will be insured so as to reduce to a minimum any possibility of the valve being inadvertently opened or closed.

With the foregoing objects in view, together with such other objects and advantages as may subsequently appear, my invention resides in the parts, and in the construction, arrangement and combination of parts or their equivalents hereinafter described and claimed, and illustrated by way of example in the accompanying drawings, in which—

Figure 1 is a view in side elevation of a hose and nozzle showing the invention as applied.

Figure 2 is a view in vertical longitudinal section, of the valve, showing it in its closed position.

Figure 3 is a plan view of the valve with a portion of the valve casing removed and showing parts in horizontal section.

Figure 4:
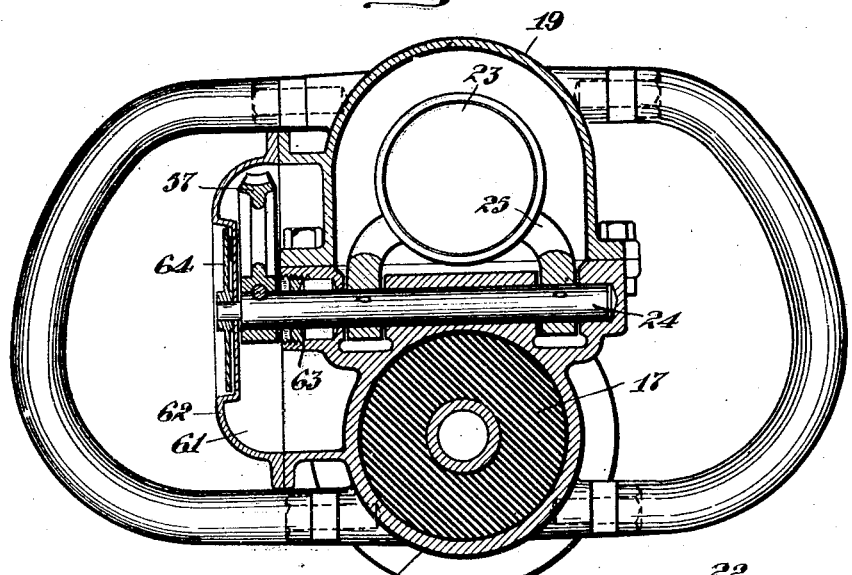
Figure 4 is a view in transverse section and elevation, as seen on the line 4—4 of Figure 2.

More specifically, 10 indicates the valve casing which embodies a substantially cylindrical tubular portion 11, one end of which is adapted to be connected to a hose 12, the opposite end of which is adapted to be connected to a nozzle 13; the tubular portion 11 forming a main passage 14 which is designed to afford a straight communication between the hose and nozzle. The passage 14 is formed intermediate its ends with an inclined shoulder 15 which constitutes a valve seat and forms the margin of a main port 16; a valve member 17 being provided, adapted to close the port 16 when seated on the valve seat 15. The valve casing is formed with a by-pass passage 18 formed by a demountable cover member 19 mounted on the tubular portion 11 of the valve casing, there being ports indicated at 20 and 21 in the valve casing 11, affording communication between the passage 18 and the end portions of the tubular valve portion on opposite sides of the port 16. The ports 20 and 21 extend on a plane substantially at right angles to the plane of the port 16, and the passage 18 is curved longitudinally from the port 20 to the port 21. Valve members 22 and 23 are provided, which are adapted to close the ports 20 and 21, as will be later described. The valve members 17, 22 and 23 are carried on a common rock shaft 24 so as to be moved collectively on turning the rock shaft, the rock shaft being mounted to extend transversely of the tubular portion 11 of the valve casing, to one side of the port 16 and at a point between the ports 20 and 21. The mounting of the valve embodies a yoke 25 which is affixed to the rock shaft 24 and projects into the passage 18. The outer portion of the yoke is formed with a flange 26 on which is carried a stem 27 adapted to project through the port 20 and extend into the passage 14 in the tubular portion 11 of the valve casing, as shown in Figure 2; the valve 17 being carried on the end portion of the stem 27, and the valve 22 being carried on an intermediate portion of the stem 27, with the valves 17 and 22 arranged at right angles relative to each other. The valve 23 is carried by the yoke 25, being affixed to a lug 28 formed adjacent to the flange 26. The valve 23 extends on a plane substantially at right angles to the plane of the valve 22.

Figure 5:
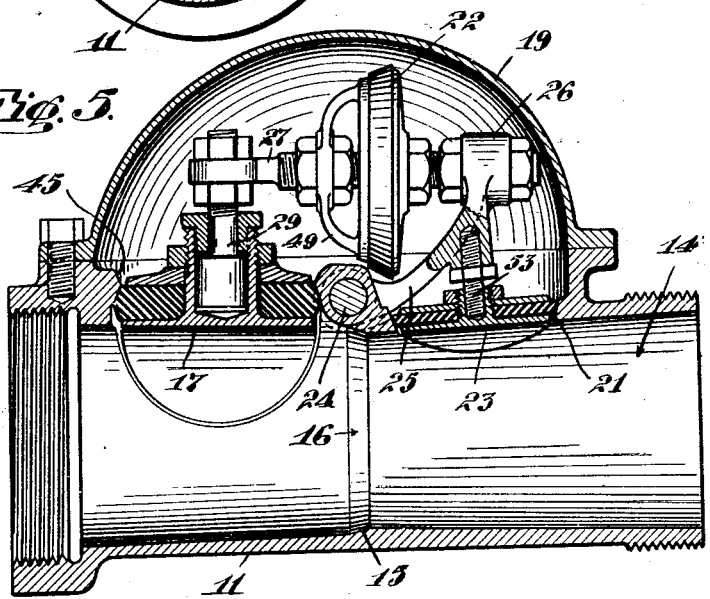
Figure 5 is a view of the valve in vertical longitudinal section showing it in its open position.

The valves 17, 22 and 23 are so arranged relative to each other that when the valve 17 is positioned to close the port 16, the valve 22 will close the port 20 and the valve 23 will be disposed in its open position as shown in Figure 2; and are also so relatively arranged that when the valve 23 is positioned to close the port 21, the valve 17 will be disposed to close the port 20, as shown in Figure 5.

In order to insure the proper seating of the several valves, means are provided for adjusting each valve on its mounting. For this purpose valve 17 is carried on a stem 29 which extends at right angles to the stem 27, and has screw engagement with an internally threaded opening 30 in the latter, whereby the extent of the projection of the stem 29 from the stem 27 may be varied as occasion may require; there being lock nuts 31 screwed on the stem 29 on opposite sides of the stem 27 adapted to bear against the stem 27 and thereby securely hold the stem 29 against movement relative to the stem 27. The outer end of the stem 29 is formed with a head 32 which extends into a socket 33 formed by a sleeve 34 on a plate 35 constituting a member of the valve 17. A collar 36 has screw engagement with the sleeve 34 and encircles the stem 29 rearward of the head 32, whereby the valve member 33 is held in place on the stem 29. The head 32 and valve member 35 are designed to have a slight movement relative to each other longitudinally of the stem 29 so as to permit the valve 17 to move independent of the stem 29 such distance as to insure the valve being properly seated when the valve 22 is in its seated position; the valve 17 thus being capable of movement relative to the valve 22 so as to compensate for slight inaccuracies in relative adjustment of the valve and also compensate for wear of the valves. The valve 17 also embodies a seating member 37 comprising an annulus of rubber or similar resilient material, which annulus surrounds the sleeve 34 and is held between the plate 35 and a washer 38 by means of a nut 39 screwed on the sleeve 34. The annulus 37 is designed to seat on the inclined valve seat 15 of the port 16, as shown in Figure 2, and is also designed to seat on a valve seat 40 formed on the under side of the margin of the port 20 when the valve 17 is in its fully opened position, as shown in Figure 5.

The valve 22 embodies a pair of plates 42 and 43 between which is interposed an annulus 44 of rubber or other similar yieldable material which annulus is adapted to seat on a tapered valve seat 45 formed on the upper portion of the margin of the port 20. The plates 42 and 43 with the annulus therebetween are carried on the stem 27 and are adapted to be held in adjusted position thereon by nuts 46, 47 and 48 screwed on the stem; the nuts 47 and 48 engaging the opposite sides of a spider 49 formed on the plate 43, by which the latter is held against movement on the stem 27, and the nut 46 bears on the plate 42 to maintain the valve member in place. The valve member may be adjusted longitudinally on the stem 27 so that it may be disposed to properly seat relative to the valve 17. The stem 27 is also adjustably mounted in the flange 26, it passing through an opening in the flange and being engaged on the opposite sides of the flange by adjusting nuts 50 and 51.

The valve 23 embodies a disk 52 carried on a threaded stem 53 adjustably mounted on the lug 28, there being an annulus 54 of rubber or similar material interposed between the disk 52 and the clamping plate 55, which annulus is adapted to seat on the tapered margin 56 of the valve port 21 when the valve 23 is in its closed position. The threaded stem 53 engaging the lug 28 serves as a means for adjusting the valve 23 so that it may be positioned to properly close the port 21 when the valve 17 is disposed to close the port 22.

The valves 17 and 23 are so designed that when they are positioned to close the ports 21 and 22 the plates 35 and 52 of the valves will extend substantially flush with the surface of the main valve passage 14 as shown in Figure 5, so as to afford no obstruction to the flow of water through the passage 14, and also afford no recesses or depressions which would create eddies in the stream flowing through the passage 14.

Any suitable means may be employed for actuating the rock shaft to operate the valve, the means here shown in Figures 1, 3, and 4 embodying a worm sector 57 mounted on the end portion of the rock shaft 24 which projects through the side walls of the cylindrical valve casing, which worm sector meshes with a spiral gear 58 on a shaft 59 fitted with a hand wheel 60. The worm sector and the spiral gear are so arranged that on rotation of the shaft 59 a turning movement of the rock shaft 24 will be effected so as to operate the valves.

The worm sector and spiral gear are enclosed in a chamber 61 formed by a cap 62 mounted on the valve casing, which chamber 61 may be packed with a heavy grease.

A packing gland 63 encompasses the rock shaft 24 where the latter passes through the valve casing to form a leak proof bearing for the shaft.

An indicator 64 may be mounted on the rock shaft and arranged exteriorly of the cap 62 to indicate the position of the main valve 17 relative to the ports 16 and 20 adapted to be closed thereby.

Figure 6:
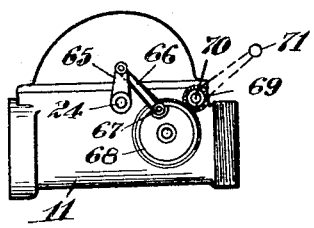
Figure 6 is a detail in elevation, illustrating a modified form of the valve-operating mechanism.

Another means for operating the rock shaft 24 is shown in Figure 6, which means embodies a crank 65 carried on the rock shaft 24 exteriorly of the casing, which crank is pivotally connected to a link 66, the outer end of which is pivoted at 67 to a toothed wheel 68 which meshes with a pinion 69 on a shaft 70 fitted with a crank 71. The toothed wheel 68, link 66, and crank 65 are so arranged relative to each other and to the valves, that when the valve 17 is in its closed position the link 66 will be positioned on dead center so that rotation of the gear 68 in either direction will operate to rock the rock shaft and move the valve 17 to its open position, thus providing a means for insuring opening of the valve irrespective of direction of movement of the crank 71, thus insuring against accidental jamming of the valve.

In the operation of the invention; when the valve 17 in the main passage 14 is in its closed position, as shown in Figure 2, the valve 22 will close the port 20, forming a communication between the main passage and one end of the by-pass passage, and the other valve 23 will be disposed in its open position. Water pressure rearward of the main passage valve 17 will hold the latter tightly closed by reason of the latter being free to move to its seat independent of its movement under action of the rock shaft 24. In opening the valve the rock shaft is turned to unseat the valves 17 and 22 substantially coincidentally; the valve 22 however opening slightly in advance of the opening of the valve 17 by reason of the loose mounting of the latter. As the valves 17 and 22 start to open a portion of the liquid will pass through the port 16 and another portion will pass through the port 20, the latter portion flowing through the by-pass passage and discharging into the main passage through the port 21. The water pressure will then bear on the valves 17 and 22 whereby the pressure acting on the valve 22 will tend to open the latter while the pressure on the valve 17 will tend to oppose the opening thereof thereby effecting a balance, which enables ready opening and closing of the valves.

When the valve 17 is disposed in its fully open position, it will serve to close the port 20 and cut out the by-pass passage, and the valve 23 will close the port 21, as shown in Figure 5. The valves 17 and 23 will then extend flush with the walls of the main passage 14 so as to afford no obstruction to the flow of water through the latter. The valve 27 enclosing the port 21 will obviate the formation of recesses in the side of the main passage 14 which would otherwise exist, thus obviating any tendency to the formation of eddy currents in the stream flowing through the valve.

The closing of the main passage is effected by reversing the direction of rotation of the rock shaft 24 where the latter is actuated by the spiral gear and worm sector arrangement, as shown in Figures 3 and 4, but where the valve-operating means shown in Figure 6 is employed, continued rotation of the toothed wheel 68 beyond the point of opening the main passage valve, will operate to close the latter.

I claim—

1. In a valve, a valve casing having a main passage and a by-pass passage communicating at its ends with the main passage, a valve adapted to open and close the main passage at a point between the communications of the by-pass passage, a valve adapted to close one of the communications to the by-pass passage when the main passage is closed, the valve in the main passage being adapted to close said last named communication when said valve is in its fully open position, and a valve adapted to close the other by-pass passage when the main passage is open.

2. In a valve, a valve casing having a main passage and a by-pass passage communicating at its ends with the main passage, a valve for opening and closing the main passage at a point between the communications of the by-pass passage, adapted when open to close one of said communications, and a valve adapted to open and close the other communication, adapted to close the communication when the main passage valve is disposed to close the other communication and operable to open the communication controlled thereby when the main passage valve is closed.

3. In a valve, a valve casing having a main passage and a by-pass passage communicating at its ends with the main passage, a valve for opening and closing the main passage at a point between the communications of the by-pass passage, adapted when open to close one of said communications, and a valve adapted to open and close the other communication, adapted to close the communication when the main passage valve is disposed to close the other communication and operable to open the communication controlled thereby when the main passage valve is closed, and a valve located in the by-pass passage adapted to close one of the communications when the main passage valve is in its closed position.

4. In a valve, a valve casing having a main passage and a by-pass passage communicating at its ends with the main passage, a valve for opening and closing the main passage at a point between the communications of the by-pass passage, adapted when open to close one of said communications, and a valve adapted to open and close the other communication, adapted to close the communication when the main passage valve is disposed to close the other communication and operable to open the communication controlled thereby when the main passage valve is closed, and a valve located in the by-pass passage adapted to close one of the communications when the main passage valve is in its closed position, and means for adjusting the several valves relative to each other.

5. In a valve, a valve casing having a main passage and a by-pass passage, said by-pass passage communicating at its ends with the main passage, a pair of valve members located in the by-pass passage and operable collectively so that when either of the valves is in closed position the other will be disposed in open position, and a third valve member adapted to close the main passage at a point between the communications of the by-pass passage when one of the pair of valves is in its fully open position, and adapted to close the communication controlled by the other of the said pair of valves when the latter valve is in its open position.

6. In a valve, a valve casing having a main passage and a by-pass passage, said by-pass passage communicating at its ends with said main passage, a pair of valves arranged in the by-pass passage operable to alternately open and close the communications between the by-pass passage and the main passage, and a third valve adapted to open and close the main passage at a point between the communications in the by-pass passage, and means whereby said valves may be operated collectively.

7. In a valve, a valve casing having a main passage and a by-pass passage communicating at its ends with the main passage, a pair of valves located in the by-pass passage and adapted to alternately open and close communications between the by-pass passage and the main passage, a rock shaft for actuating said valves, and a third valve operable by said rock shaft adapted to alternately close the main passage between the by-pass communications and one of the by-pass passages.

8. In a valve, a valve casing having a main passage and a by-pass passage communicating at its ends with the main passage, a pair of valves located in the by-pass passage and adapted to alternately open and close communications between the by-pass passage and the main passage, a rock shaft for actuating said valves, and a third valve operable by said rock shaft adapted to alternately close the main passage between the by-pass communications and one of the by-pass passages, and means for adjusting said valves relative to each other.

9. In a valve, a valve casing having a main passage and a by-pass passage communicating at its ends with the main passage, a pair of valves located in the by-pass passage and adapted to alternately open and close communications between the by-pass passage and the main passage, a rock shaft for actuating said valves, and a third valve operable by said rock shaft adapted to alternately close the main passage between the by-pass passage communications and one of the by-pass passages, said main passage valve being capable of independent movement relative to the shaft.

10. In a valve, a valve casing having a main passage and a by-pass passage having its ends communicating with said main passage, a valve for closing the main passage at a point between the communications of said by-pass passage, a pair of valves located in the by-pass passage adapted to alternately open and close the communications between the by-pass passage and the main passage, one of said valves closing one of the communications when the main passage is closed, and the other of a pair of valves cooperating with the main passage valve to close both communications to the by-pass passage when the main passage valve is open, and means for operating said valves collectively.

JOHN L. WILLIAMS.